(12) United States Patent
Schlachter et al.

(10) Patent No.: US 9,508,043 B1
(45) Date of Patent: Nov. 29, 2016

(54) EXTRACTING DATA FROM DOCUMENTS USING PROXIMITY OF LABELS AND DATA AND FONT ATTRIBUTES

(71) Applicant: INTERNATIONAL BUSINESS MACHINES CORPORATION, Armonk, NY (US)

(72) Inventors: Michael Joseph Schlachter, Tarrytown, NY (US); Elvir Sinanovic, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/016,982

(22) Filed: Feb. 5, 2016

(51) Int. Cl.
*G06N 5/04* (2006.01)
*G06F 17/30* (2006.01)

(52) U.S. Cl.
CPC ......... *G06N 5/046* (2013.01); *G06F 17/30011* (2013.01)

(58) Field of Classification Search
None
See application file for complete search history.

(56) References Cited

U.S. PATENT DOCUMENTS

| 7,860,312 B2 | 12/2010 | Handley et al. |
| 8,897,563 B1 | 11/2014 | Welling et al. |
| 8,954,839 B2 * | 2/2015 | Sharma ................. G06Q 10/10 715/221 |
| 2004/0103367 A1 * | 5/2004 | Riss .................... G06F 17/2264 715/223 |
| 2012/0159313 A1 * | 6/2012 | Dejean ................. G06F 17/212 715/247 |
| 2013/0223743 A1 | 8/2013 | Deryagin et al. |

OTHER PUBLICATIONS

McKeeman et al., A Short Course in Compilers 2007, Dartmouth University, http://www.cs.dartmouth.edu/~mckeeman/cs48/mxcom/doc/Symbols.html; http://www.cs.dartmouth.edu/~mckeeman/cs118/xcom/doc/Xcfg.html.*
Pliny the Elder, Naturalis Historia [date unknown, circa 1st century AD], publisher unknown, vol. 1, http://www.perseus.tufts.edu/hopper/text?doc=Plin.+Nat+toc.*
Guidelines for the Preparation of an Index Apr. 5, Univesity of Georgia Press, http://www.ugapress.org/upload/indexing.pdf.*

* cited by examiner

*Primary Examiner* — Jason Liao
(74) *Attorney, Agent, or Firm* — Shimokaji IP

(57) ABSTRACT

A method for identifying information in a document may include analyzing the document for a text block containing a structure element, wherein said structure element is a position, font attribute, or text character; applying a rule based analysis on the text block to identify an adjacent label and field containing a value; and identifying said label and said value as a label and value pair in the document.

1 Claim, 1 Drawing Sheet

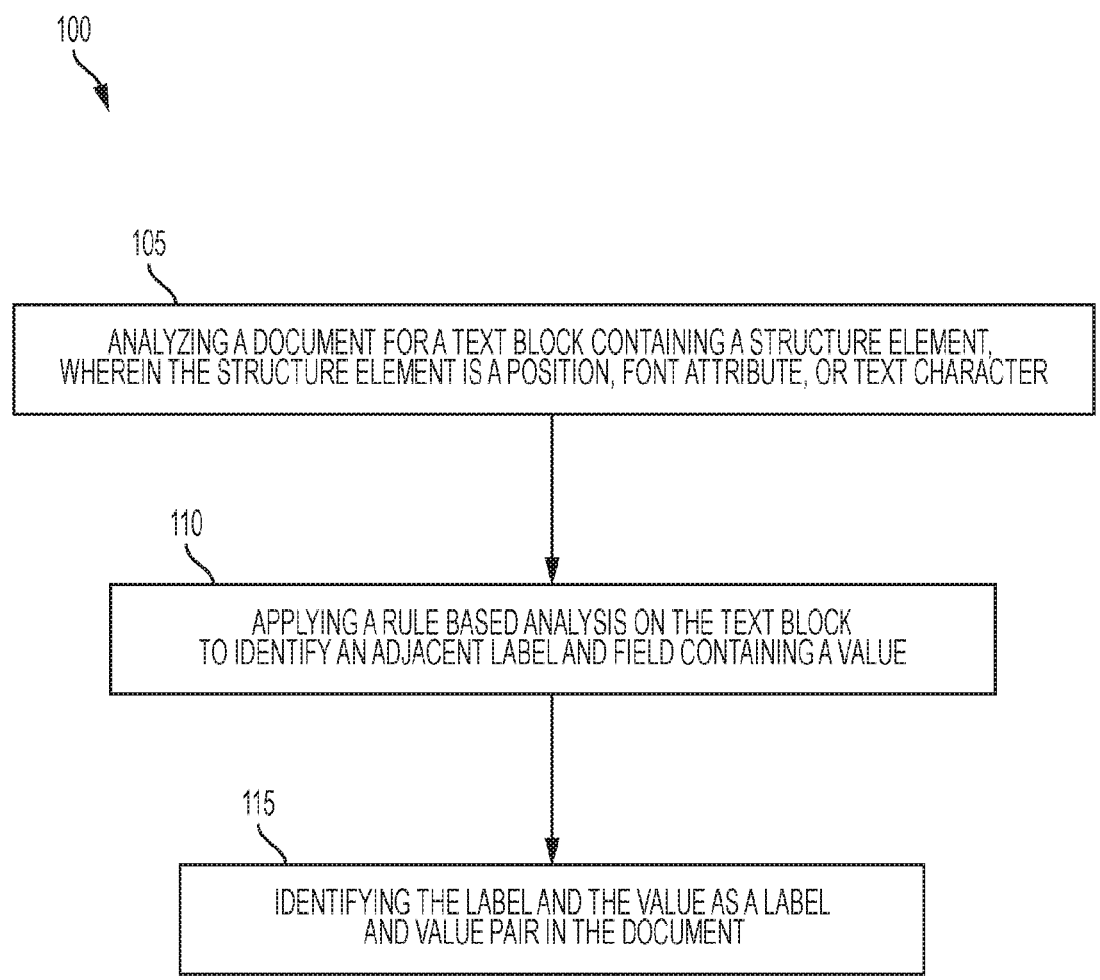

EXTRACTING DATA FROM DOCUMENTS USING PROXIMITY OF LABELS AND DATA AND FONT ATTRIBUTES

BACKGROUND OF THE INVENTION

The present invention generally relates to extracting data. More particularly, the present invention relates to extracting data from documents using proximity of labels and data and font attributes.

Extraction of data from documents can require significant effort. This extraction of data may be required to process electronic documents successfully.

As can be seen, there is a need for a method of extracting data from documents using proximity of labels and data and font attributes.

SUMMARY OF THE INVENTION

In one aspect, a method for identifying information in a document comprises analyzing the document for a text block containing a structure element, wherein said structure element is a position, font attribute, or text character; applying a rule based analysis on the text block to identify an adjacent label and field containing a value; and identifying said label and said value as a label and value pair in the document.

These and other features, aspects and advantages of the present invention will become better understood with reference to the following drawings, description and claims.

BRIEF DESCRIPTION OF THE DRAWINGS

FIG. 1 illustrates a method of identifying information in a document.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method for extracting data from documents using proximity of labels and data and font attributes.

In FIG. 1 a method 100 for identifying information in a document may include a step 105 of analyzing a document for a text block containing a structure element wherein the structure element is a position, font attribute, or text character. A step 110 may include applying a rule based analysis on the text block to identify an adjacent label and field containing a value. A step 115 may include identifying the label and the value as a label and value pair in the document.

In an embodiment, the method 100 may use position, font attributes, and text characters of a structure element within a document to identify label and value pairs within the document. This analysis can be performed on scanned documents where optical character recognition was performed, or on electronic documents and spreadsheets.

In an embodiment, the method 100 may provide automatic identification of label and value pairs. The basis for identifying a pair may be to evaluate text contained in the pair, or evaluate blocks of text adjacent to the pair. A block may be a grouping of text that a person would consider logically grouped together through visual inspection of a document. Blocks can contain other blocks. For example a table may be a block containing rows which contain cells that are considered blocks. A block can contain a block that is a line of text. A line of text can contain blocks that are words and spaces. A word may contain blocks that are characters. Another example of a block can be a heading followed by a paragraph. Groups of text that are close together above or below or side by side with space between them and other text is a block. This invention may not describe identifying blocks of text and may assume the text is already correctly grouped into blocks.

In an embodiment, the method 100 may include the requirement that a label may contain no more than 4 words. Separator characters such as a colon may be removed from the end of labels. Data in a block identified as a Header, Footer, Title, Heading, or Paragraph may not be considered a pair.

In an embodiment, the method 100 may include the requirement that if the first word of the block is bold, then identify the first non-bold word in the same line. If a non-bold word is found make sure no further non-bold characters are present in the block. The bold portion of the block may be considered the label and the non-bold portion may be considered the value.

Example:
First Name John

In an embodiment, the method 100 may include the requirement that the first word of the block contains only upper case characters, then identify the first word in the same line that is contains lower case characters. The words that contain only upper case characters may be considered the label and the words that contain lower case characters may be considered the value.

Example:
FIRST NAME John

In an embodiment, the method 100 may include the requirement that if the first word of the block is not bold look for the first bold word in the same line. If a bold word is found make sure no further bold characters are present in the block. The non-bold portion of the block may be considered the label and the bold portion may be considered the value.

Example:
First Name John

In an embodiment, the method 100 may include the requirement that the first word of the block contains lower case characters, then identify the first word in the same line that is contains lower case characters. The words that contain lower case characters may be considered the label and the words that contain only upper case characters may be considered the value.

Example:
First Name JOHN

In an embodiment, the method 100 may include a requirement that when a block contains a word ending with a separator character such as a colon the words preceding the separator may be considered the label and the following words may be the value.

Example:
First Name: John
In this example the pair label is "First Name" and the value is "John".

In an embodiment, the method 100 may include the requirement that when a table has two columns, a first column may contain labels and a second column may contain values when the first column has only bold characters and the second does not.

Example:

| First Name | John |
|---|---|
| Last Name | Smith |

In this example there are two pairs. The label of the first pair is "First Name" and the value is "John". The label of the second pair is "Last Name" and the value is "Smith".

In an embodiment, the method 100 may include the requirement that when a table has two columns, a first column may contain labels and a second column may contain values when the first column contains only non-bold characters and the second contains only bold characters Example:

| First Name | John |
|---|---|
| Last Name | Smith |

In this example there are two pairs. The label of the first pair is "First Name" and the value is "John". The label of the second pair is "Last Name" and the value is "Smith".

In an embodiment, the method 100 may include the requirement that when a table has two columns, a first column may contain labels and a second column may contain values when the first column cell value ends with a separator character.

Example:

| First Name: | John |
|---|---|
| Last Name: | Smith |

In this example there are two pairs. The label of the first pair is "First Name" and the value is "John". The label of the second pair is "Last Name" and the value is "Smith".

In an embodiment, the method 100 may include the requirement that when a table has two columns, a first column may contain labels and a second column may contain values when either the first or second cell has all capital letters or the other does not.

Example:

| FIRST NAME | John |
|---|---|
| Last Name: | SMITH |

In this example there are two pairs. The label of the first pair is "First Name" and the value is "John". The label of the second pair is "Last Name" and the value is "Smith".

In an embodiment, the method 100 may include a feature that when a table has two or more columns the first column may contain the labels and the second column may contain values on two or more rows. If the first column has bold text and/or ends with a separator character such as a colon, the text in each row of the second column may be combined into one value.

Example:

| Name: | John |
|---|---|
|  | Doe |

In this example the label will be "Name" and the value will be "John Doe".

In an embodiment, the method 100 may include a feature that if the first line is bold and/or ends with a separator character such as a colon and there is one following line the first line may be considered a label and the second a value.

Example:
First Name:
John

It should be understood, of course, that the foregoing relates to exemplary embodiments of the invention and that modifications may be made without departing from the spirit and scope of the invention as set forth in the following claims.

What is claimed is:

1. A method for identifying information in a document, comprising:
    scanning a document using optical character recognition;
    analyzing the scanned document for a text block within the scanned document, containing wherein the text block contains a structure element, wherein said structure element is a position, font attribute, or text character, and wherein a plurality of label and value pairs within the scanned document are identified based on the contents of the text block within the structure element;
    applying a rule based analysis on the text block to identify an adjacent a label and a field containing a value, wherein data in a text block identified as a header, footer, title, heading, or paragraph is not included in any label and value pair:
        wherein in response to a first word in the text block being bold and a second word in the text block being non-bold, then the first word in the text block is the label and the second word in the text block is the value;
        wherein in response to the first word in the text block being non-bold and the second word in the text block being bold, then the first word in the text block is the label and the second word in the text block is the value;
        wherein in response to the first word in the text block containing only lower case characters and the second word in the text block containing only upper case characters, then the first word in the text block is the label and the second word in the text block is the value;
        wherein in response to the first word in the text block being followed by a separator character, and there being a second word after the separator character, then the first word in the text block is the label and the second word in the text block is the value;
        wherein in response to a first line in the text block containing a first word in bold followed by a separator character, and a second line in the text block containing a second word in non-bold, then the first line in the text block is the label and the second line in the text block is the value; and
    identifying said label and said value as a label and value pair in the document.

* * * * *